350-274

CROSS REFERENCE SEARCH ROOM

TX350/274

GAP PATTERN FOR CHOPPER OF RADIATION SEARCH SYSTEM

Filed Feb. 5, 1964 2 Sheets-Sheet 1

Feb. 28, 1967 K. SCHMUTZ 3,307,038

GAP PATTERN FOR CHOPPER OF RADIATION SEARCH SYSTEM

Filed Feb. 5, 1964 2 Sheets-Sheet 2

United States Patent Office

3,307,038

Patented Feb. 28, 1967

3,307,038

GAP PATTERN FOR CHOPPER OF RADIATION SEARCH SYSTEM

Karl Schmutz, Zurich, Switzerland, assignor to Albiswerk Zurich A.G., a Swiss corporation Filed Feb. 5, 1964, Ser. No. 342,738

Claims priority, application Switzerland, Feb. 7, 1963, 1,538/63

4 Claims. (Cl. 250—83.3)

My invention relates to a coordinate indicator for search devices and particularly to a detector for continuously determining the coordinates of an image point in the image field of an infrared radiation search device.

Flying bodies or other moving objects, which are identifiable by the optical, infrared, or other quasi-optical raditions emanating therefrom, may be automatically followed along their paths, or remotely controlled along a predetermined path, by a radiation search device. The search device continuously focusses the radiation emanating from the moving object upon an image field in the device, and from the coordinates of the image point produced by the rays upon the image field, determines the incidence angle of these rays relative to the optical axis of the search device. More specifically, at the image field, a rotating chopper or scanner disc, exhibiting alternate zones of different transparency to the incident rays, modulates the intensity of the rays passing through the rotating disc according to the coordinate position of the image point in the image field. The modulated beam thus carries information determining the coordinates of the image point.

Known chopper discs produce some inaccuracies.

An object of this invention is to provide a more accurate system of this kind particularly with regard to a chopper disc which will produce more accurate results.

The features of novelty characterizing the invention are pointed out particularly in the claims forming a part of this specification. Other objects and advantages of the invention will become obvious from the following detailed description of an embodiment of the invention when read in light of the accompanying drawings. It will be obvious to those skilled in the art that the invention may be embodied otherwise without departing from its spirit and scope. In the drawings:

Figure 2:
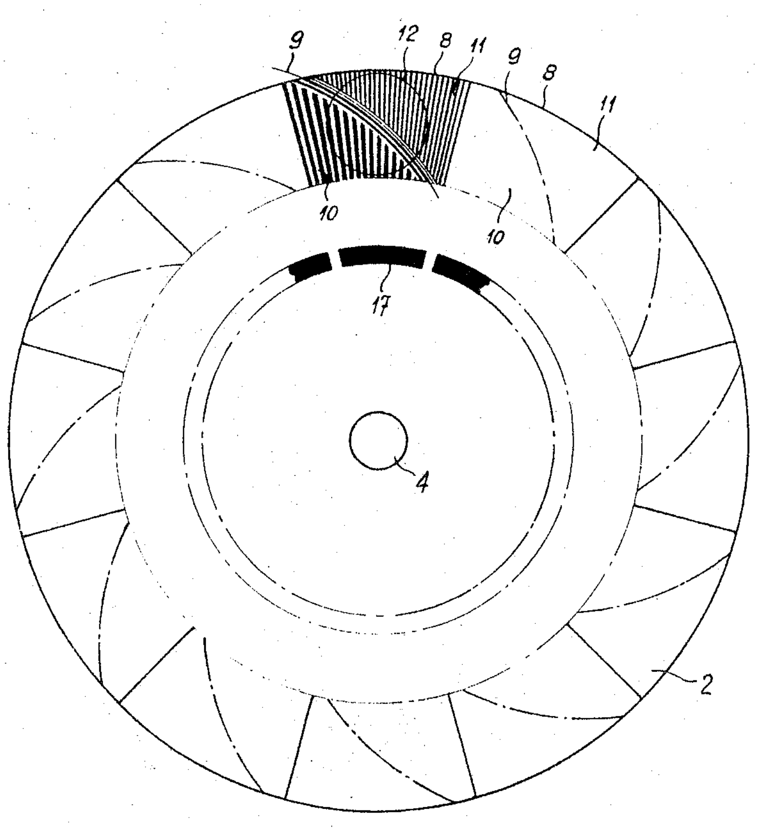
FIG. 2 is a chopper disc for use in a system of FIG. 1, and embodying features of this invention.
Figures 3, 4, 5, 6:
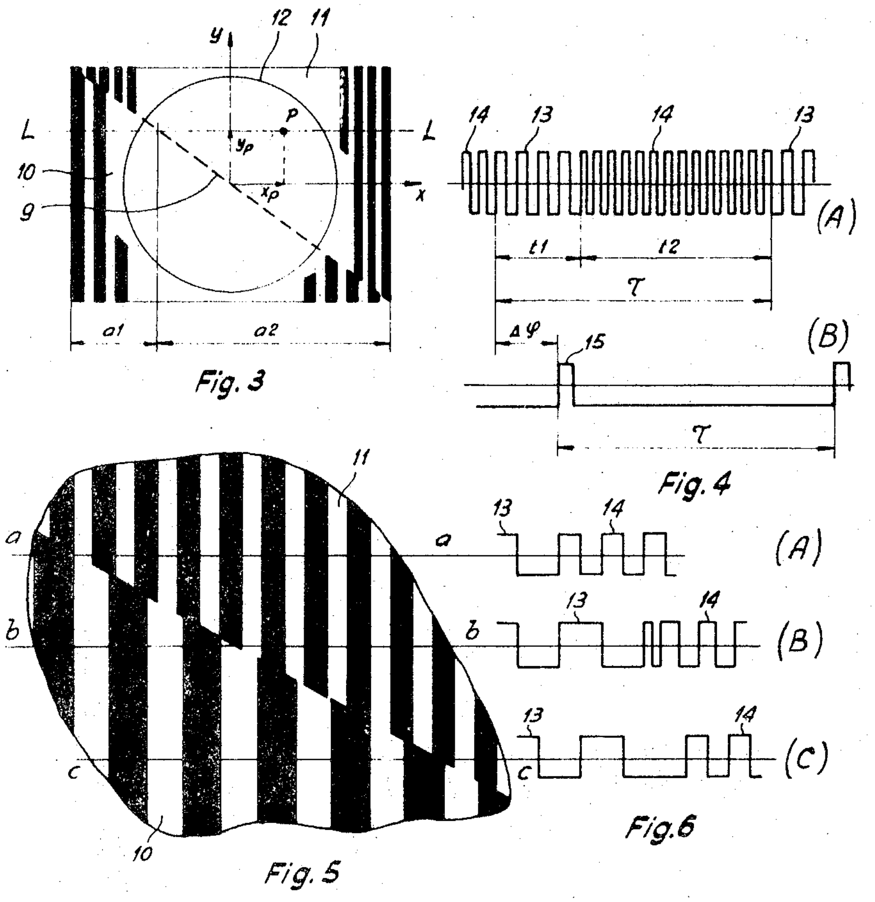
FIG. 3 is a more detailed partially broken-away schematic representation of a section of FIG. 2, wherein the disc radius has been infinitely enlarged for convenience.

FIG. 4 comprises two graphs A and B illustrating the output of a sensor as it detects the radiation after it has been chopped at an image point by the chopper of FIG. 2.

FIG. 5 is an even more detailed representation of a portion of the disc in FIG. 2.

Figure 7:
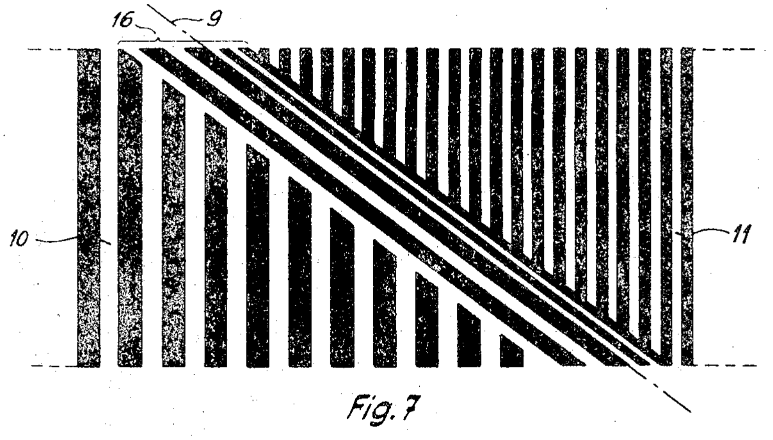

FIG. 6 comprises three graphs, A, B, and C, illustrating the output of a sensor detecting the rays of three focused image points after the radiation has been chopped at three sections of the chopper disc shown in FIG. 5; and FIG. 7 is a detailed diagram of several sections of the disc of FIG. 2 embodying features of the invention.

Figure 1:
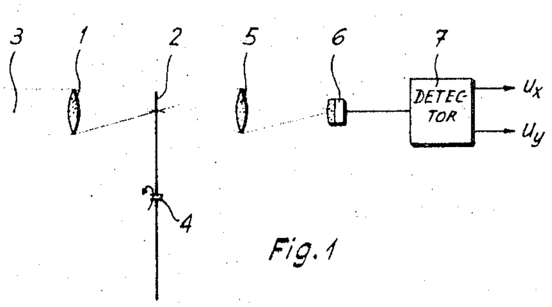
FIG. 1 is a block representation of a search or follower system according to the present invention.

FIG. 1 schematically illustrates the basic concept of a radiation search system. The optical portion thereof comprises an objective 1 for focussing the rays emanating from the object observed upon a chopper or scanning disc 2 rotating in the image plane of the objective and about an axis 4 outside of the optical axis 3 of the system. The chopper disc 2 periodically interrupts passage of the radiation along the system optical-axis 3. A collector optic 5 of the optical axis 3 focusses the interrupted radiations upon a radiation sensitive detector cell 6, also on axis 3. The detector cell 6 produces electrical pulse signals corresponding to the periodically interrupted radiation in an electrical detecting apparatus 7. On the basis of the detected pulse-modulated signals the device 7 indicates position information at its output in the form of voltages $V_x$ and $V_y$ representing the coordinates of an image point on a Cartesian coordinate system drawn at the center of the stationary image field in the plane of the chopper disc.

The rotating chopper disc 2 is constructed as partially shown in FIG. 2. The radiation image is focussed on the outer circular ring-shaped track having the form of a radial gap pattern which is periodic in the circular direction of the track movement and which repeats itself in sequential sector-forming sections 8. Only one section of the gap pattern in FIG. 2 is shown complete.

A dividing line 9 extending diagonally to the gap pattern divides each section 8 into two fields 10 and 11 wherein the gaps of the pattern respectively occupy different angles relative to the disc radius. Extending parallel to the dividing line 9 are a plurality of gaps forming a transfer zone 16 wherein the gap sizes near the field 10, measured along the track direction, correspond to those in field 10 and the gaps near the field 11 measured along the track direction correspond in size to those in field 11. The ratio of the gap angles of the gap pattern in the two fields of each sector 8 is 1 to 1.5. The circle 12 indicates the outline of the image field which remains stationary as the chopper disc 2 rotates. The successive sectors 8 are substantially identical.

According to the prior art, the dividing line 9 merely divides the two fields, there being no transfer zone 16 between the fields 10 and 11. The need and effect of the transfer zone 16 will be evident from considering FIG. 3. This shows a section 8 of FIG. 2 as it would appear were the transfer zone 16 omitted as in the prior art. For simplicity, the disc radius in FIG. 3 is made infinitely large. The radiation emanating from a point source, which the objective 1 focusses upon an image point P in the image field 12, is chopped by the gap pattern of the disc. The track of the latter moves to the left in FIG. 3. Thus the image point P and the image field 12 move, or can be considered to move, to the right relative to the gap pattern of the track. The gap pattern has a repetition frequency which depends upon the gap angles (or widths) and the angular speed of the gap pattern. As the gap pattern moves to the left, the gap angles (or widths) suddenly change from those originally appearing in the field 10 to those appearing in the field 11 when the image passes the border line 9. Correspondingly, the radiation pulse frequency sensed by detector 6, and the electrical pulse frequency at the output of detector 6, suddenly change as the border line 9 moves to the left past the image point P.

Chopping in FIG. 3 begins as the pattern moves to the left and the left border of the sector intersects the point P. It continues as point P intersects the field 10. over the distance $a1$ and the field 11 over the distance $a2$. In FIG. 4, the graph A illustrates the changing-frequency pulse train from the detector 6 as the point P intersects the moving pattern along the line L—L (a circle of infinite radius). The time $t1$ of a pulse train 13 of one frequency corresponds to the distance $a1$ and the time $t2$ of the pulse train 14 of higher frequency corresponds to the distance $a2$. The letter T designates the total period for chopping by one sector. $T=t1+t2$.

From pulse train 13 and 14 it is possible to determine the coordinate $y_p$ and $x_p$ of the image point P on a coordinate system $x$–$y$ whose zero point lies at the center of the stationary image field 12. The coordinate $y_p$ of the image point P is proportional to the distance difference $a2-a1$ as can be ascertained geometrically. Thus, the time ratio $t1/t2$ is a measure of the coordinate $y_p$. The coordinate $x_p$ of the image point P is proportional to the angular difference $\Delta\phi$ between the point of frequency change from pulse train 13 to the pulse train 14 and a reference pulse train 15 (FIG. 4 graph B) which is produced by sensing a stationary radiation source with the start of a reference track 17 (FIG. 2) and whose duration is T. Thus only the time point of the frequency shift in each sector is necessary for evaluating the pulse trains obtained in the prescribed manner. The measuring accuracy depends substantially on the accuracy with which these time points can be determined.

These switching time from one to the other frequencies of the gap pattern at the borders between the individual sectors is quite definite. The particular time point of the frequency shift of the impulse signals at the border is also definite. However, certain transfer points at the border line 9 in the gap pattern do not produce pulse signals which definitely indicate a frequency shift. The cause of this discrepancy is obvious from FIGS. 5 and 6.

FIG. 5 is an enlargement of a portion of the transfer zone at border line 9 and FIG. 6 has three pulse diagrams A, B and C, which result from the moving pattern intersecting three image points along lines *a—a*, *b—b*, and *c—c*, in FIG. 5. Pulse diagram A illustrates a recognizable and specific frequency transfer. However, diagrams B and C for lines *b—b* and *c—c* respectively illustrate disturbances. These disturbances make the precise frequency shift point somewhat vague. For successive sectors 8 chopping a single image point these disturbances manifest themselves by the output signal $V_y$ varying stepwise instead of evenly in dependence upon variation of coordinates $y_p$.

FIG. 7 illustrates a detail of a section 8 in FIG. 2 embodying the invention. The structure of FIG. 7 obviates the usual errors occurring between the fields 10 and 11. This is accomplished by means of the transfer zone 16 wherein the gap pattern runs parallel to the border line 9 of both fields. In each portion belonging to one field of the transfer zone 16 the gap pattern exhibits the same widths in the movement direction of the track as the corresponding field 10 or 11. In this manner, the unavoidable instability of the chopping device is shifted into a range which is unimportant for the purpose of evaluation. At each position of the border-line 9, the frequency reversal or change is specifically determined with regard to position as well as time.

The width of the transfer zone is determined according to the characteristic of the means provided for the signal evaluation in the electronic device 7 of FIG. 1. As a rule of thumb, it can be stated that the disturbing function to be obviated, which starts at the border of the transfer zone, must be eliminated by the time of the frequency change.

The invention can be applied to transversely movable choppers such as those in the form of an endless film strip.

It will be recognized that the image field 12 and the Cartesian coordinate system are centered on the optical axis 3.

Other devices of this general type also using chopper discs or reticle discs with radial gaps or spokes, are discussed in the copending application for "Coordinate Indicator for Search Devices of Peter Aemmer, filed on or about the date of this application, and in the application of Arno Welti, Serial No. 322,439 filed November 8, 1963, both assigned to the assignee of this application.

Also it should be obvious that in this embodiment each spoke has a transparency to the radiation markedly different from that of each adjacent gap. On the other hand in any continuous or even area of the pattern the spoke and gap angles are equal.

I claim:

1. A chopper in the radiation path of the sensor of a radiation search system, said chopper comprising an annular track intersecting the radiation path, said track comprising a plurality of sections, each of said sections comprising a first gap pattern having gaps of a first width, a second gap pattern having gaps of a second width different from said first width, a border line between said first and second gap patterns extending diagonally to said gap patterns and a transfer zone comprising a first transfer gap pattern on one side of said border line having gaps of said first width extending parallel to said border line and a second transfer gap pattern on the other side of said border line having gaps of said second width extending parallel to said border line.

2. A chopper as claimed in claim 1, wherein said chopper is of disc configuration and the sections of said track are defined by segments of radial lines.

3. A chopper as claimed in claim 2, wherein the gaps of each of said first and second gap patterns extend radially and the border line extends angularly to the gaps of said first and second gap patterns.

4. A chopper as claimed in claim 3, wherein the number of gaps of each of said first and second transfer gap patterns is considerably less than the number of gaps of each of said first and second gap patterns.

References Cited by the Examiner

UNITED STATES PATENTS

| | | | |
|---|---|---|---|
| 3,144,555 | 8/1964 | Aroyan et al. | 250—83.3 |
| 3,219,828 | 11/1965 | Foster | 250—237 X |

RALPH G. NILSON, *Primary Examiner.*

S. ELBAUM, *Assistant Examiner.*